April 7, 1936.   M. AMIRAULT   2,036,385
BRAKE
Filed Sept. 28, 1934
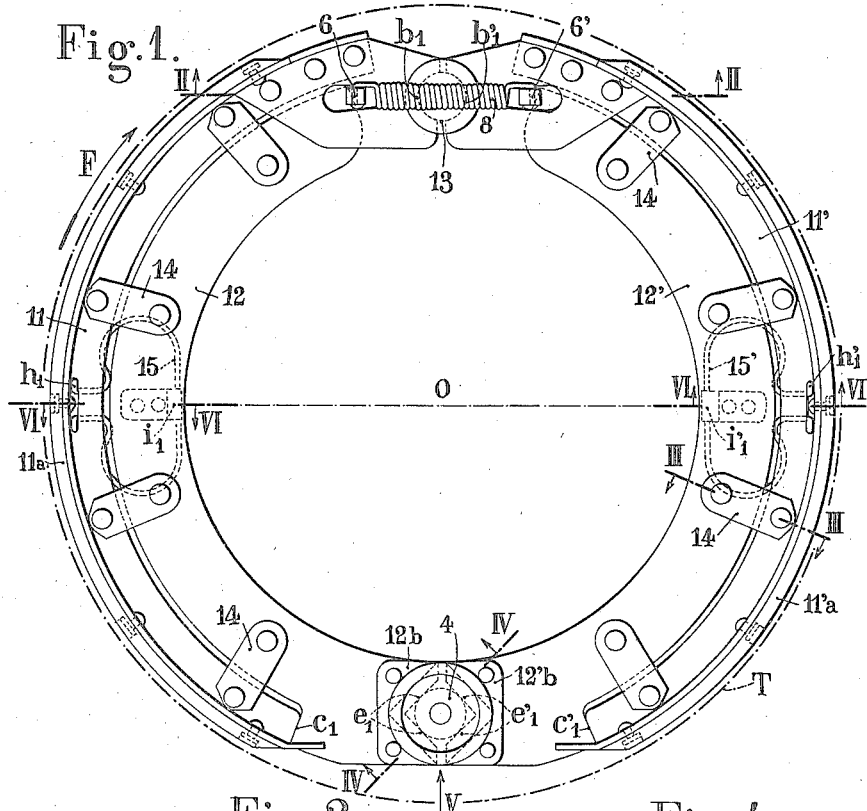
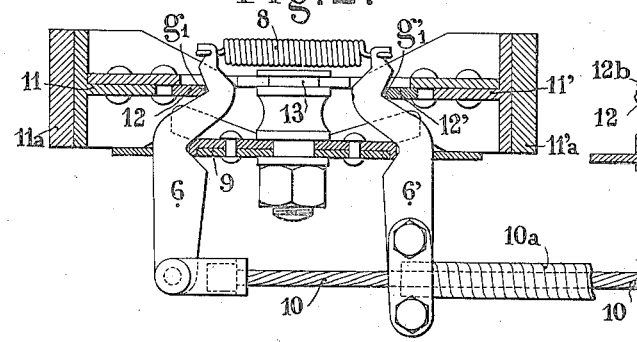
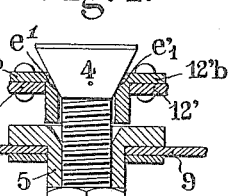
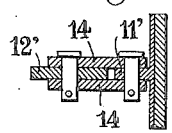
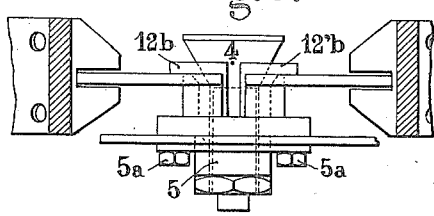
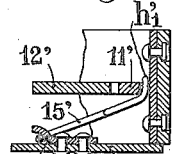
M. Amirault
INVENTOR
By: Glascock Downing Seebold
Attys.

Patented Apr. 7, 1936

2,036,385

UNITED STATES PATENT OFFICE 2,036,385

BRAKE

Maxime Amirault, Paris, France, assignor to Société Anonyme Francaise du Ferodo, Paris, France Application September 28, 1934, Serial No. 746,009
In France October 2, 1933

4 Claims. (Cl. 188—78)

This invention relates to improvements in friction devices used in brakes, couplings, etc., and, more particularly to those of the type in which two shoes or jaws, mounted on one of the two members connected by the friction device, cooperate with a bearing portion or drum mounted on the other member, in such a manner that, in operative position, the friction stresses are symmetrically distributed on both these jaws, and cause them to operate under compression stress, whatever may be the direction in which said members move relatively to each other.

In this device, the shoes or jaws bear, in operative position, upon substantially fixed abutments arranged, at their ends, on a support placed against these jaws, and are urged in the direction for setting the friction members into operative position, in opposition to the action of suitably arranged returning means, by operating levers, so-called "jaw levers."

The device according to the invention is mainly characterized by the fact that each jaw lever actuates the corresponding jaw through a plurality of bearing points distributed throughout the length of these two elements.

The transmission of the stress exerted on the friction members and thus distributed, strains the jaw levers and the jaws much less than when this stress is concentrated on a single bearing point between each jaw lever and the corresponding jaw.

A first advantage of this feature is to avoid the distortion of the jaw levers and jaws, and to prevent the drums, or the like, with which the jaws cooperate, from thereby becoming oval as is usually the case owing to this distortion, thus constantly ensuring a uniform application of the friction members on each other throughout their surface.

The said feature also allows, whilst ensuring a more satisfactory application than with the ordinary devices, of making the jaw levers and jaws of much lighter construction than in said ordinary devices. It is even possible to use jaws of the semi-rigid type.

Another object of the invention is to ensure the bearing of each jaw lever upon the corresponding jaw through the medium of a plurality of links pivotally connected, at their ends, to one and the other of these two elements respectively, and directed according to substantially radial directions. These links thus solely ensure the transmission, from the jaw levers to the jaws, of the normal application stress and cannot transmit, in the reverse direction, the reaction of the tangential stresses due to friction.

A further object of the invention is to provide the edges of the jaw levers, adjacent to their ends each resting on a fixed bearing point, with shoulders on which bear the corresponding ends of the jaws.

The accompanying drawing illustrates, by way of example only, a form of construction of the device according to the invention.

Fig. 1 is an elevation, as seen from the side where the drum is located.

Figs. 2, 3, 4 are sections made according to lines II—II, III—III and IV—IV, respectively, of Fig. 1.

Fig. 5 is an elevation as seen when looking in the direction of the arrow V of Fig. 1, with parts broken away.

Fig. 6 is a section made according to line VI—VI of Fig. 1.

This form of construction, which is assumed to be applied to a brake drum, comprises, within said drum, diagrammatically indicated in dot and dash lines at T, two brake shoes 11, 11', for instance of the semi-rigid type, preferably made of profiled sheet metal or steel, and provided with friction linings 11$a$, 11'$a$.

Both brake shoes, symmetrically arranged, cooperate, on the one hand, with a fixed cylindrical abutment 13, on which each of them bears, at one of its ends, at $b_1$, $b'_1$, and, on the other hand, with brake shoe levers 12, 12'. These levers 12, 12', arranged inwardly of the brake shoes, constitute, on their edges, shoulders or abutments on which the brake shoes bear, at $c_1$, $c'_1$, through their ends opposed to $b_1$, $b'_1$.

Each lever 12, 12' is moreover connected to the corresponding brake shoe by a number of links 14 (four, for instance) suitably arranged for ensuring the transmission of the brake applying stress to the brake shoes; these two groups of four links are symmetrically arranged, as well as the brake shoes and the brake-shoe levers, so that the operation of the device remains the same, whatever may be the direction in which the drum T rotates.

The above device is fitted on a supporting plate 9, on which the abutment 13 is secured.

An adjustable conical abutment 4 is also secured on this plate 9, by means of nuts and bolts 5, 5$a$, and is located diametrally opposite the abutment 13 relatively to the axis $o$ of the device.

V-shaped ledges 12$b$, 12'$b$ bear, at $e_1$, $e'_1$ upon the abutment 4, these ledges being respectively secured to an end of each of the brake-shoe levers 12, 12'.

The opposite ends of these levers 12, 12' bear, at $g_1$, $g'_1$, upon control levers 6, 6', which are actuated, in the direction for applying the brake, by any suitable operating device, comprising for instance a Bowden cable 10—10a.

The various elements of this mechanism are urged towards their brake-releasing position by a returning device comprising, in the example illustrated in the drawing, on the one hand, a tension spring 8 connecting the ends of both levers 6, 6' and, on the other hand, for each brake shoe 11, 11', a spring 15, 15'; these springs are attached at their middle portion, at $i_1$, $i'_1$, to the supporting plate 9, and, at their ends, at $h_1$, $h'_1$, to the brake shoes 12, 12'.

The operation of this device is as follows:

The control levers 6, 6', transmit to the brake-shoe levers 12, 12', by amplifying it, the brake-applying stress they receive from the Bowden cable 10—10a, and this stress is then transmitted to the brake shoes 11, 11', with a ratio of transmission of $\frac{2}{1}$.

If the drum rotates in the direction of the arrow F, the brake shoe 11 moves away from the shoulder of the lever 12 on which it was bearing at $c_1$, and is pressed upon the abutment 13, at $b_1$, while the brake shoe 11', moving away from the abutment 13, is pressed upon the shoulder $c'_1$ of the lever 12', which itself presses, at $e'_1$, upon the fixed abutment 4; this brake shoe 11' therefore also operates under a compression stress.

The braking stress is thus uniformly and symmetrically distributed on both brake shoes, and the same is true if the direction of rotation of the drum is reversed, the modes of operation of both brake shoes then being simply inverted.

It is to be understood that the device described herein solely by way of example, can receive suitable modifications according to circumstances, without thereby departing from the scope of the invention.

I claim:—

1. In a brake with a movable drum and a fixed brake plate, the combination of two rigid levers, arranged in such manner as to extend from a point of the periphery of the plate in the direction of a diametrally opposed point, a fixed axis upon one side of the said plate and on which are pivotally mounted the two rigid levers, an abutment on the external side of the every one of the said levers and in the vicinity of the said fixed axis, controlling means so arranged as to space apart the opposite ends of the said rigid levers, a fixed abutment on the said plate and diametrally opposed to the said fixed axis, two semi-rigid segments loosely inserted between the abutment provided on every one of the said levers and the said fixed abutment, returning means so arranged as to cause the said segments to bear against the said abutments in the position of rest, and a plurality of connecting links articulated, on the one hand, to the said rigid levers, and on the other hand, to the said semi-rigid segments, at various points situated between their ends.

2. A brake as claimed in claim 1, in which the controlling means used for spacing apart the free ends of the said rigid levers are constituted by a set of two levers disposed in parallelism with the axis of the drum and bearing by one of their ends against the free end of the said rigid levers, a Bowden cable and flexible cover intended to operate the opposite ends of the said levers.

3. A brake as claimed in claim 1, in which the fixed abutment to which the rigid levers are articulated is constituted by a conical axis against the sides of which bear the ends of the said rigid levers, this conical axis being devised in such manner as to be able to be moved in the axial direction and to adjust the spacing apart of the ends of the said rigid levers.

4. A brake as claimed in claim 1 in which the end of the two semi-rigid segments bearing upon the fixed abutment on the brake plate is so arranged as to allow said segments to pivot about said fixed abutment.

MAXIME AMIRAULT.